United States Patent [19]

O'Dell

[11] 4,452,617
[45] Jun. 5, 1984

[54] DIRTY GAS INLET FOR A FILTER IN A BAGHOUSE INSTALLATION

[75] Inventor: Leonard J. O'Dell, Louisville, Ky.

[73] Assignee: Allis-Chalmers Corporation, Milwaukee, Wis.

[21] Appl. No.: 453,516

[22] Filed: Dec. 27, 1982

[51] Int. Cl.³ ............................................. B01D 46/02
[52] U.S. Cl. .................... 55/341 R; 55/302; 55/418; 251/58; 251/228; 251/299
[58] Field of Search ............... 55/341 R, 341 M, 418, 55/97, 302; 251/58, 299, 228

[56] References Cited

U.S. PATENT DOCUMENTS

| | | | |
|---|---|---|---|
| 1,784,339 | 12/1930 | Clasen et al. | 55/302 |
| 3,057,137 | 10/1962 | Perlis et al. | 55/341 M |
| 3,410,422 | 11/1968 | Carpentier | 251/228 |
| 3,834,662 | 9/1974 | Huntington | 251/121 |
| 4,272,263 | 6/1981 | Hancock | 55/377 |
| 4,376,638 | 3/1983 | Dunseith | 55/97 |

Primary Examiner—Bernard Nozick
Attorney, Agent, or Firm—Thomas G. Anderson

[57] ABSTRACT

A dirty gas inlet arrangement for a filter housing including an inlet housing connecting an elongated outlet in a dirty gas supply manifold to the dirty gas chamber of the filter housing. The inlet housing is provided with a downwardly sloping bottom wall causing particulate materials separating from the dirty gases to flow into the dirty gas chamber, and a damper assembly for selectively closing off the elongated outlet in the manifold to prevent dirty gases from flowing into the dirty gas chamber. The damper assembly includes a shaft rotatably supported within the inlet housing, a lever arm cantilevered from the shaft, an elongated damper blade sized to underlie the marginal edge of the outlet pivotally secured to the free end of the lever arm, and an actuating assembly for selectively rotating the shaft to lift the blade into sealing engagement with the marginal edge of the outlet and to lower the blade into an inobtrusive position adjacent to the bottom wall.

8 Claims, 5 Drawing Figures

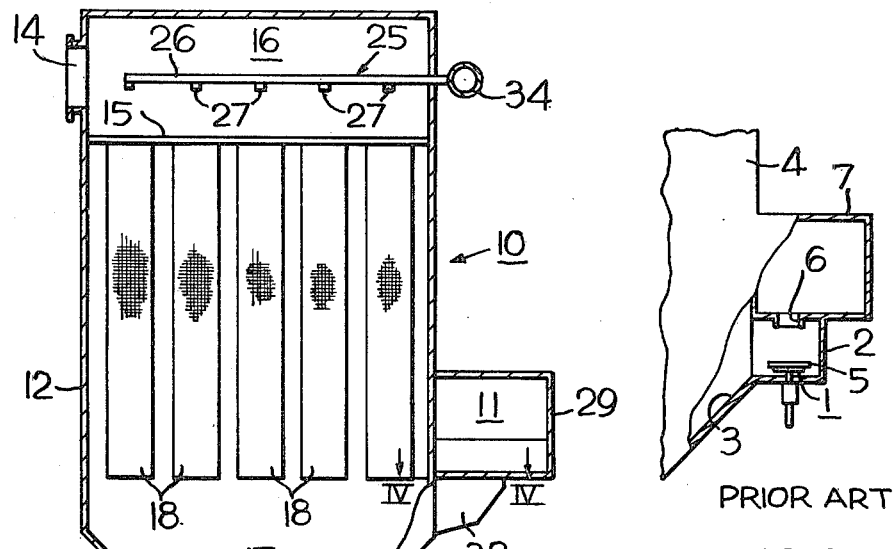
PRIOR ART
FIG. 1
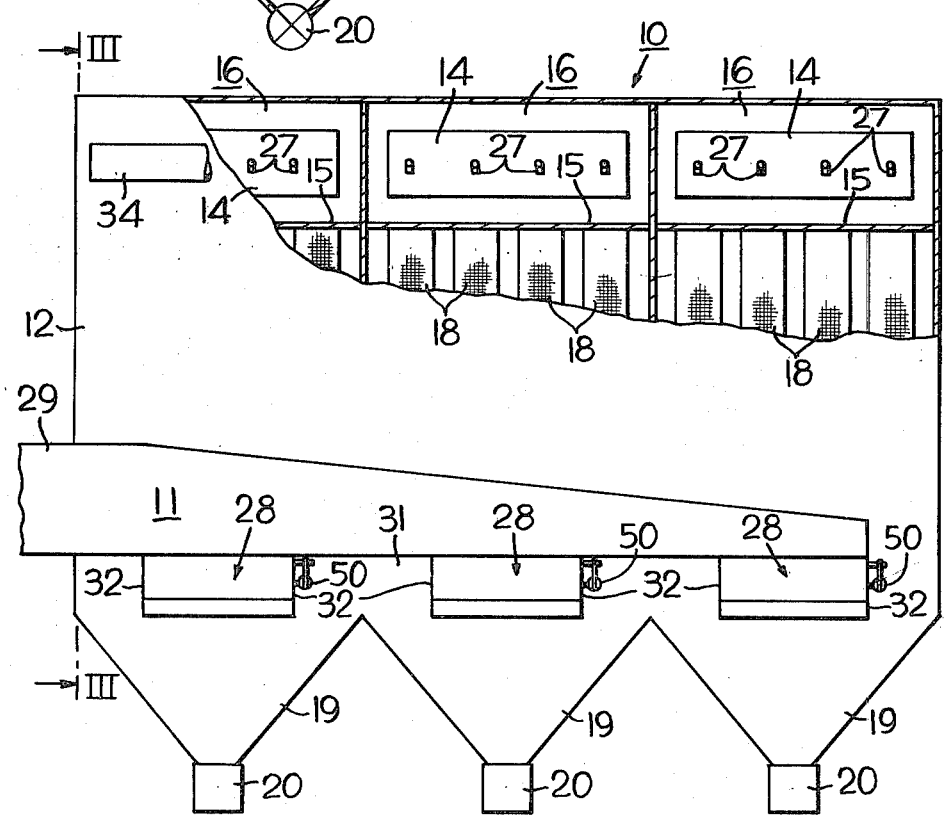
FIG. 3
FIG. 2

DIRTY GAS INLET FOR A FILTER IN A BAGHOUSE INSTALLATION

BACKGROUND OF THE INVENTION

1. Field of the Invention

The present invention relates to gas filtering devices and in particular to a dirty gas inlet arrangement for a filter baghouse.

2. Description of the Prior Art

The prior art discloses a variety of dirty gas inlet arrangements for conducting a dirty gas stream into the dirty gas chambers of each of the filter baghouses in a baghouse installation. Both butterfly and bullseye type dampers have commonly been used for this purpose. However, in baghouse installations utilizing butterfly dampers to regulate the dirty gas flow, experience has shown it usually is very difficult to completely seal off the inlet duct for maintenance or filter cleaning operations. Consequently, it has often been the practice to use round bullseye type dampers such as disclosed in U.S. Pat. No. 3,834,662 for this purpose as that type of arrangement has proven to be more effective in sealing off the dirty gas ducts connecting the dirty gas chambers to the dirty gas manifold of the baghouse installation. As shown in FIG. 1 entitled "Prior Art", this type of arrangement typically includes a round bullseye damper 1 which is mounted in a square inlet duct 2 opening into the dirty gas chamber 3 of a filter housing 4 which includes a blade 5 which is adapted to be raised to close off an outlet 6 from a dirty gas manifold 7, and lowered to the position shown in the drawing to allow dirty gases to flow into the dirty gas chamber from the dirty gas manifold. While this arrangement has been satisfactory in many applications, it has resulted in high inlet velocities in the dirty gas stream as it enters the dirty gas chamber necessitating the installation of a baffle or similar flow distributing device within the dirty gas chamber to adequately distribute the flow across the chamber to maintain a uniform gas flow through the filter bags. Additionally, the cross-section of the inlet duct in this type of arrangement necessary to provide sufficient clearance for the blade when the damper is opened has also created regions of reduced circulation in the inlet duct where particulates tend to separate out of the dirty gas flow and accummulate in the duct.

SUMMARY OF THE INVENTION

The present invention relates to gas filtering devices and in particular to a dirty gas inlet arrangement for the filter housing of a baghouse installation.

The baghouse installation incorporating the invention includes a flow-through filter housing, an apertured plate dividing the filter housing into an upper clean gas plenum and a lower dirty gas chamber, a plurality of filter bags suspended in the housing to provide flow-through communication between the dirty gas chamber and the clean gas plenum through the filter bags, an outlet in the filter housing opening to the clean gas plenum providing for the egress of clean gases from the plenum, and the dirty gas inlet arrangement providing for the ingress of dirty gases in to the dirty gas chamber.

The dirty gas inlet arrangement includes an inlet housing forming a duct connecting an elongated outlet in a dirty gas supply manifold to an inlet in the filter housing opening into the dirty gas chamber. The inlet housing is provided with a bottom wall which slopes downwardly from the manifold to the filter housing so that any particulate materials separated from the dirty gas stream as it flows through the inlet duct are conveyed into the filter housing where they fall into a hopper at the bottom of the housing.

To enable an operator to stop the flow of dirty gases into the filter housing, a damper assembly is secured within the inlet housing to selectively close off the elongated outlet in the manifold. The damper assembly includes a pivot shaft rotatably supported within the inlet housing, at least one lever arm cantilevered from the shaft, an elongated damper blade sized to underlie the marginal peripheral edge of the elongated outlet pivotally secured to the free end of the lever arm, and actuating means for selectively rotating the shaft to lift the damper blade into sealing engagement with the marginal edge of the elongated outlet and to lower the damper blade into an inobtrusive position generally adjacent the sloping bottom wall to open the outlet.

From the foregoing, it can be seen that the invention contemplates a relatively straight-forward and easily fabricated arrangement which eliminates the need for flow distributing baffles or the like in the dirty gas inlet while at the same time providing a self-cleaning construction. In this regard, it is to be understood that various changes and modifications can be made in the apparatus disclosed herein without departing from the spirit and scope of the invention.

DESCRIPTION OF THE DRAWINGS

FIG. 1 shows a partial vertical cross-sectional view of a prior art dirty gas inlet arrangement in a filter housing similar to the filter housings in the baghouse installation incorporating the invention;

FIG. 2 is a front elevational view, partially in section, of a baghouse installation incorporating the invention;

FIG. 3 is a cross-sectional view taken substantially along line III—III in FIG. 2;

DESCRIPTION OF THE PREFERRED EMBODIMENT

Figure 4:
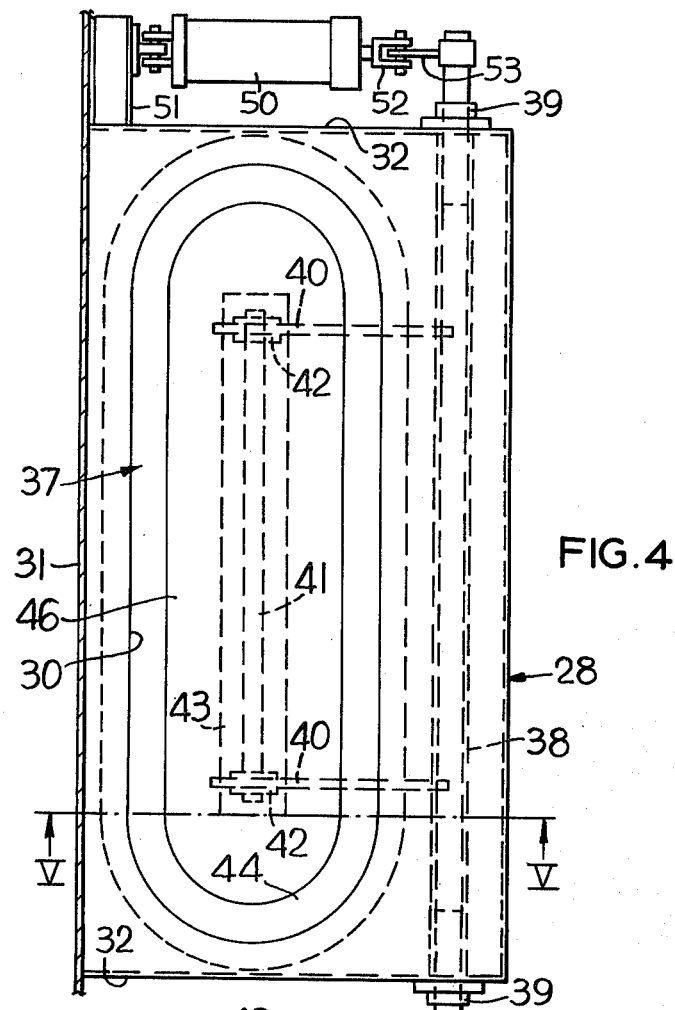
FIG. 4 is a partial cross-sectional view taken substantially along line IV—IV in FIG. 3.

Referring to the drawings, the baghouse installation 10 incorporating the dirty gas inlet arrangement 11 embodying the invention includes a plurality of flow-through housings 12 having a dirty gas inlet 13 and a clean gas outlet 14. Each of the housings 12 includes a transversely extending apertured plate or partition 15 which divides the housing 12 into an upper clean gas plenum 16 and a lower dirty gas chamber 17, and a plurality of filter bags 18 are suspended in the dirty gas chamber 17 in registry with the apertures in the partition 15 to filter the dirty gases as they flow from the dirty gas chamber 17 into the clean gas plenum 16. U.S. Pat. No. 4,272,263, which is incorporated by reference, illustrates one method of suspending the filter bags 18 from the partition 15. In that arrangement, a flexible resilient cuff is provided on the upper end of each of the filter bags which is adapted to embraceably engage the marginal peripheral edge of each of the apertures to secure the bag to the partition.

During filtering operations, particulate materials are separated from the dirty gases and deposited on the exterior of each of the filter bags 18 as the gases flow through the bags. These materials are collected in a suitable hopper 19 secured below the dirty gas chamber 17, and periodically removed from the hopper 19 through a discharge outlet 20 as is well known in the art. To accommodate cleaning of the filter bags 18, each housing 12 is provided with a valve controlled reverse flow flushing arrangement 25. The flushing arrangement 25 includes an inlet pipe 26 connected to a source of compressed air 54 having air injection nozzles 27 positioned above each of the filter bags 18 to inject jets or pulses of air into each of the bags during filter cleaning operations.

Each of the dirty gas inlets 13 is connected by an inlet housing 28 to a common dirty gas manifold 29 having an elongated bottom outlet 30 extending generally parallel to the vertical side wall 31 of each of the housings 12, it being noted that the dirty gas inlet 13 opens into the dirty gas chamber 17 beneath the lower ends of the filter bags 18. The inlet housing 28 includes spaced vertical walls 32 which are welded or otherwise appropriately secured to the bottom of the manifold 29 and the side wall 31, and a bottom wall is 33 similarly secured between the walls 32 so that it slopes downwardly from the manifold 30 to the side wall 31 to form an inlet duct extending between the elongated outlet 30 and the dirty gas inlet 13. The bottom wall 33 is shaped to include a first plate portion 35 extending downwardly from the dirty gas manifold at an angle in the range of 45-55 degrees to the horizontal, and a second plate portion 36 extending from the first plate portion 35 to the side wall 31 at an angle in the range of 10-20 degrees to the horizontal to insure that any particulate materials separated from the dirty gases flowing through the inlet housing will flow into the dirty gas chamber where they drop into the hopper 19.

Figure 5:
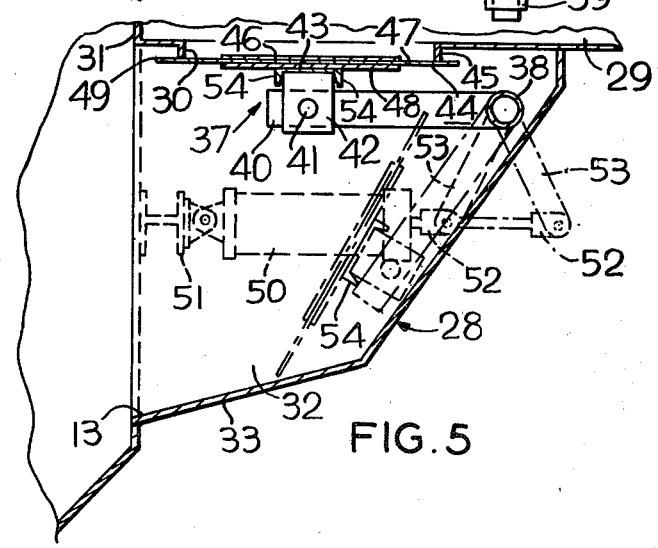
FIG. 5 is a partial cross-sectional view taken substantially along line V—V in FIG. 4.

As best shown in FIGS. 4 and 5, a damper assembly 38 is provided within the inlet duct 34 to selectively close off the elongated outlet 30. The damper assembly 37 includes a pivot shaft 38 extending generally parallel to the elongated outlet 30 which is rotatably supported by a bearings 39 mounted on the spaced walls 32 of the inlet housing 28. The bearings 39 can be any of a variety of commercially available designs and should provide a gas tight seal about the shaft 38 where it projects through the spaced walls 32. The shaft 38 has a pair of lever arms 40 cantilevered from it which are pivotally secured by a pin or rod 41 to a pair of brackets 42 projecting from a channel-shaped member 43 affixed to a damper blade 44.

As shown in the drawings, the damper blade 44 is sized to underlie and sealingly engage a downwardly projecting collar 45 forming the marginal edge of the elongated aperture 30 in the bottom of the dirty gas manifold 29. The damper blade 44 is preferably formed of laminated metal sheets 46, 47 and 48 which are secured together and affixed to the channel member 43 so that the periphery of the middle sheet 47 provides a resilient peripheral flange portion 49 adapted to flexibly engage the collar 45 to form a gas tight seal when the damper is closed. It should be noted that by pivotally securing the blade 44 to the lever arms 40, the arrangement enables the blade to automatically seat itself against the collar 45 to establish a gas tight seal. Additionally the assembly provides for limiting the relative rotation between the blade 44 and the lever arms 40 sizing the flanges 54 on the channel member 43 so they act as stops to keep the blade in an operative position. In the embodiment show, the rotation is limited to about 10 degrees.

Again referring to FIG. 5, the damper blade 44 is moved between the closed position shown in solid lines and the open position shown in phantom lines by a selectively extensible pneumatic drive cylinder 50. As shown in the drawings, the stationary end of the cylinder 50 is pivotally secured to a bracket 51 affixed to the side wall 31, and the piston arm 52 of the cylinder 51 is pivotally secured to a crank or operating arm 53 rigidly affixed to the shaft 38.

The embodiments of the invention in which an exclusive property or privilege is claimed are defined as follows:

1. In a baghouse installation including a flow-through filter housing having vertical side walls, an apertured plate dividing the filter housing into an upper clean gas plenum and a lower dirty gas chamber, a plurality of filter bags suspended in the housing having one end connected with the apertures in the plate in a fashion providing flow-through communication between the dirty gas chamber and the clean gas plenum through the filter bags, and outlet means providing for the egress of clean gas from the clean gas plenum, an improved dirty gas inlet arrangement providing for the ingress of dirty gases into the dirty gas chamber, comprising:

a dirty gas inlet in one of the side walls of the housing opening into the dirty gas chamber beneath the filter bags;

a dirty gas manifold having an elongated bottom outlet extending generally parallel to said side wall;

an inlet housing having spaced vertical walls and a bottom wall extending between the spaced vertical walls sloping downwardly from the dirty gas manifold to said side wall to form an inlet duct extending between the elongated outlet and the dirty gas inlet; and a damper assembly for selectively closing off the bottom outlet of the manifold, said assembly including a pivot shaft extending generally parallel to the bottom outlet between the spaced vertical walls, bearing means rotatably supporting the shaft within the inlet housing, a lever arm cantilevered from the shaft, an elongated damper blade sized to underlie the marginal edge of the bottom outlet secured to the free end of the lever arm, and actuating means for selectively rotating the shaft to lift the damper blade into sealing engagement with the marginal edge of the bottom outlet to close off the outlet and to lower the damper blade into a position generally adjacent the sloping bottom wall to open the outlet.

2. The dirty gas inlet arrangement according to claim 1, and said damper blade being pivotally secured to the free end of the lever arm to accommodate relative rotational movement between the blade and the arm about the longitudinal axis of the blade.

3. The dirty gas inlet arrangement according to claim 1, and said damper blade having a peripheral resilient flange portion adapted to flexibly engage the marginal edge of the bottom outlet to form a gas tight seal.

4. The dirty gas inlet arrangement according to claim 1, and said damper blade having a bracket pinned to said lever arm pivotally securing the blade to the arm, and said bracket including stop means adapted to limit relative rotational movement between the blade and the arm.

5. The dirty gas inlet arrangement according to claim 1, and
   said bottom wall including a first plate portion sloping downwardly from the manifold toward the housing, a second plate portion sloping downwardly from said first plate portion to the housing at a smaller angle to the horizontal than said first plate portion, and said damper blade extending generally parallel to said first plate portion in its lowered position.

6. The dirty gas inlet arrangement according to claim 1, and
   said actuating means including an operating arm affixed to one end of the shaft and a selectively extensible pneumatic drive cylinder having one end affixed to the housing and its other end secured to the operating arm to rotate the shaft upon actuation of the cylinder.

7. The dirty inlet arrangement according to claim 1, and
   said dirty gas manifold having a downwardly projecting sealing collar surrounding the bottom outlet providing a seat for the damper blade when it closes off the outlet.

8. A dirty gas inlet arrangement for a baghouse including a flow-through filter housing having vertical side walls, an apertured plate dividing the filter housing into an upper clean gas plenum and a lower dirty gas chamber, a plurality of filter bags suspended in the housing having one end connected with the apertures in the plate in a fashion providing flow-through communication between the dirty gas chamber and the clean gas plenum through the filter bags, and outlet means providing for the egress of clean gas from the clean gas plenum, comprising:
   a dirty gas inlet in one of the side walls of the housing opening into the dirty gas chamber beneath the filter bags;
   a dirty gas manifold having an elongated bottom outlet extending generally parallel to said side wall;
   an inlet housing having spaced vertical walls and a bottom wall extending between the spaced vertical walls sloping downwardly from the dirty gas manifold to said side wall cooperating with the manifold to form an inlet duct extending between the elongated outlet and the dirty gas inlet; and
   a damper assembly for selectively closing off the bottom outlet of the manifold, said assembly including a pivot shaft extending generally parallel to the bottom outlet between the spaced vertical walls, bearing means rotatably supporting the shaft within the inlet housing, a lever arm cantilevered from the shaft, an elongated damper blade sized to underlie the marginal edge of the bottom outlet pivotally secured to the free end of the lever arm, and actuating means for selectively rotating the shaft to lift the damper blade into sealing engagement with the marginal edge of the bottom outlet to close off the outlet and to lower the damper blade into a position generally parallel to the sloping bottom wall.

* * * * *